United States Patent [19]
Roberts

[11] 3,773,198
[45] *Nov. 20, 1973

[54] VEHICLE AMBULANCE

[76] Inventor: Bissett J. Roberts, P.O. Box 351, Waynesboro, Pa. 17268

[ * ] Notice: The portion of the term of this patent subsequent to July 4, 1989, has been disclaimed.

[22] Filed: June 14, 1972

[21] Appl. No.: 262,525

Related U.S. Application Data
[63] Continuation of Ser. No. 69,779, Sept. 4, 1970, Pat. No. 3,674,167.

[52] U.S. Cl. .............................................. 214/505
[51] Int. Cl. ............................................. B60p 3/12
[58] Field of Search ................... 214/86 A, 85, 85.1, 214/505; 14/71, 72

[56] References Cited
UNITED STATES PATENTS
3,005,461  10/1961  Arganbright ........................ 14/72 X

*Primary Examiner*—Albert J. Makay
*Attorney*—Charles E. Brown et al.

[57] ABSTRACT

This disclosure relates to a vehicle ambulance adapted to receive and transport disabled vehicles, i.e., automobiles, trucks, etc., and includes a main support having a rear end portion to which is pivotally mounted a pair of laterally spaced platform members, each of the platform members carrying on an underside thereof follower means, and a guide frame carrying a pair of actuators associated with each follower for moving the platform members between an outwardly and downwardly inclined first position relative to the main support and an outwardly and generally parallel second position relative to the main support.

The vehicle ambulance further includes means for supporting the platform members in a third generally upright vertical position, and means are provided for mounting a light assembly to the platform members in both the first and third positions thereof. The actuator means are moved in unison by means of an extensible-retractable fluid motor with the latter being articulately mounted between the main vehicle support and the laterally supported guide frame carrying the actuator means.

23 Claims, 13 Drawing Figures

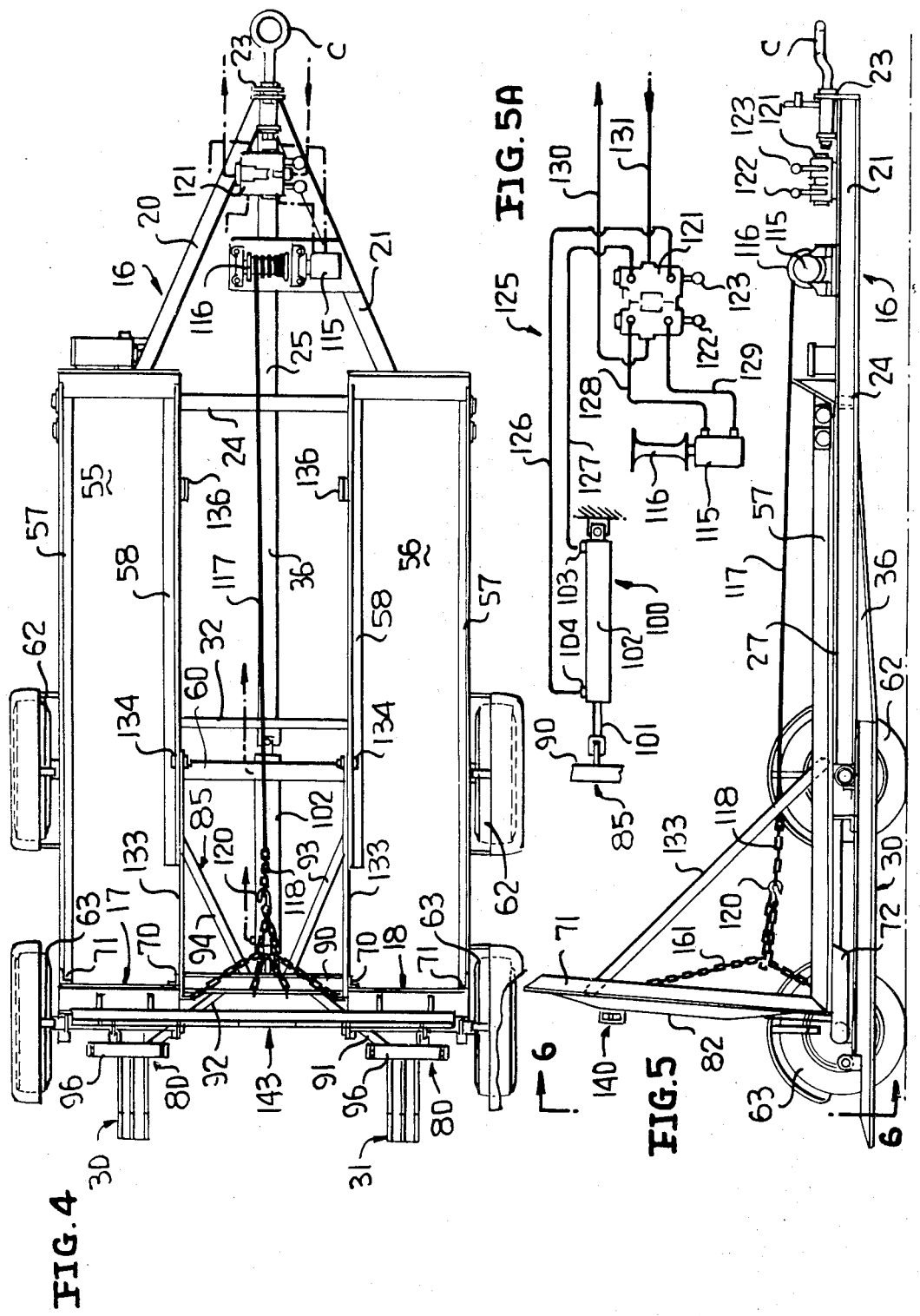

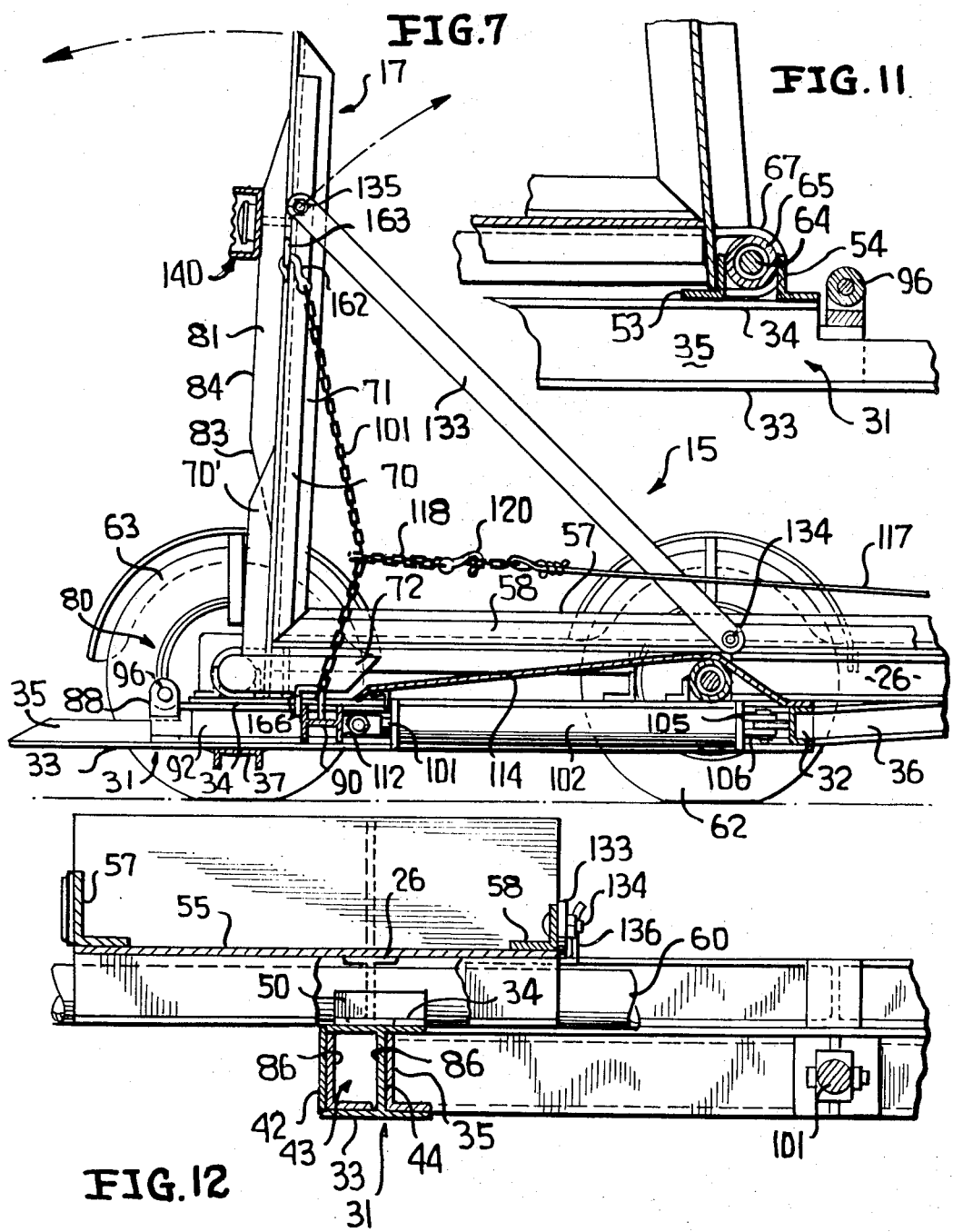

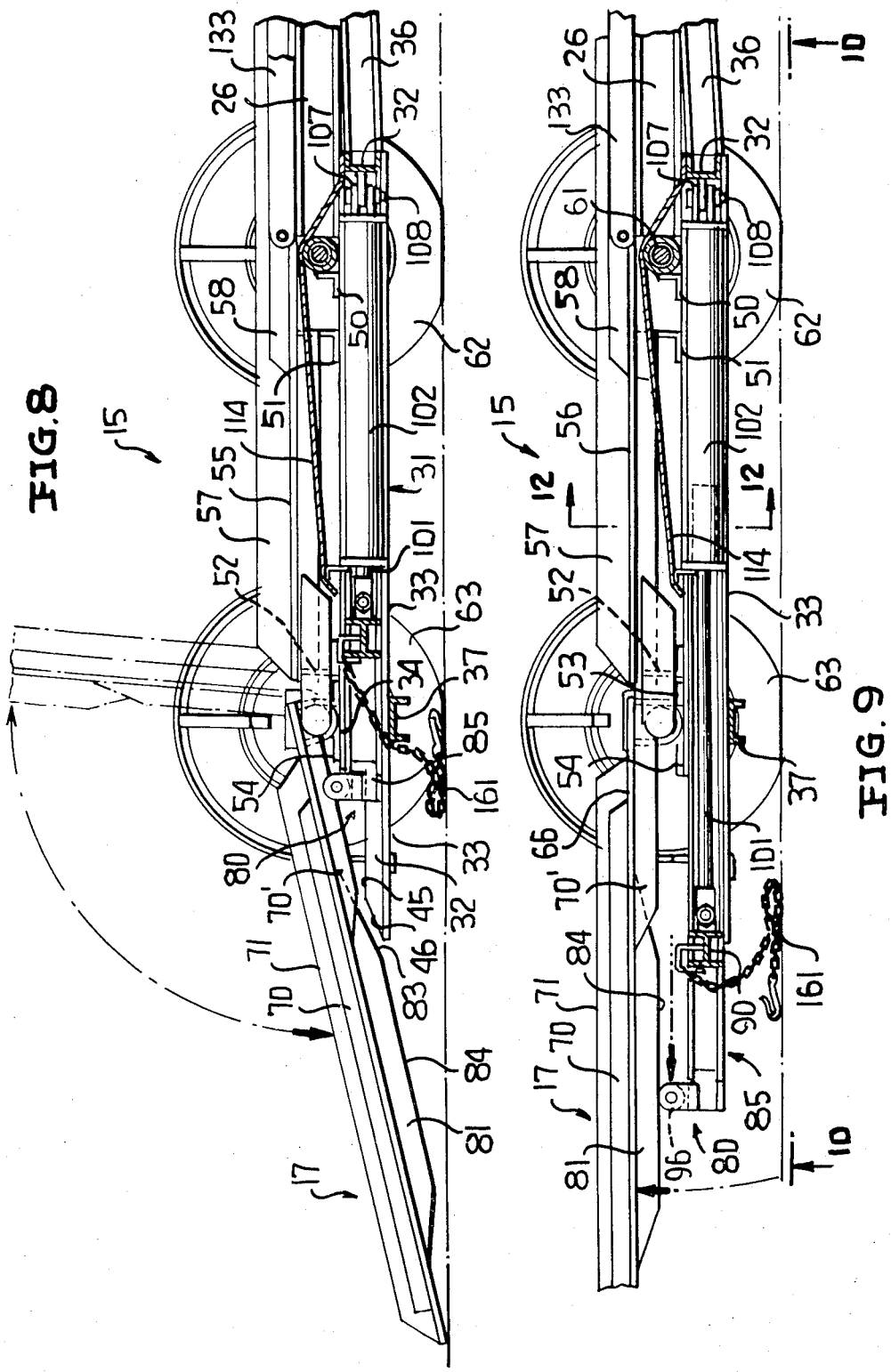

VEHICLE AMBULANCE

This is a continuation application of Application Ser. No. 69,779, filed Sept. 4, 1970, entitled VEHICLE AMBULANCE, now U.S. Pat. No. 3,674,167.

This invention relates to a vehicle for transporting disabled vehicles, such as domestic and foreign automobiles, trucks, tractors, etc., which may have been wrecked or are otherwise incapable of moving under their own power. As opposed to conventional "tow-trucks" or similar towing vehicles, the present invention is directed to a vehicle "ambulance" designated as such because the entire disabled vehicle is wholly and totally supported by the ambulance which automatically avoids known disadvantages and/or dangers of conventional "two" vehicles. For example, front bumper, grill, radiator and/or rear bumper and other miscellaneous damage associated with and caused by conventional tow trucks or tow cranes is avoided. Moreover, it is unnecessary to place conventional dolly wheels under the disabled vehicle which is conventional towing practice, though it is well known that vehicle transmissions have been damaged during towing in the absence of dollies.

It is also well known that irrespective of the cost or construction of known tow trucks or wreckers, no one tow truck will accomplish all tow jobs encountered and more importantly, once a tow truck is purchased or a pick-up truck is modified for towing its use is virtually limited to towing operations and nothing else. Thus, due to economic considerations, many service stations which would like to offer towing service are precluded from doing so either because of the prohibitive cost of tow trucks and/or scarificing the overall versatility of a pick-up truck upon the conversion of the latter for towing purposes.

The present vehicle ambulance overcomes the latter-noted disadvantages by being itself adaptable for connection to a pick-up truck or other drive vehicle with the only conversion of the latter being that of providing a fluid reservoir, a pump and conduit means for connection to hydraulically operated mechanisms of the vehicle ambulance. In this manner the pick-up truck is used as intended with or without the vehicle ambulance depending upon the intended purpose. Thus, any service station having a pick-up truck or similar vehicle can use the same freely in daily operations while upon the conversion thereof in the manner heretofore noted only minor fluid, electrical and mechanical connections are required to attach the vehicle ambulance thereto for transporting damaged and/or disabled vehicles.

In keeping with the foregoing description it is a primary object of this invention to provide a vehicle ambulance having advantages heretofore noted by more specifically constructing the vehicle ambulance to include a main support adapted to receive thereon at least a portion of a disabled vehicle, the main support being self-supportable by its own wheels and tires and having front and rear portions, the latter of which is adapted for connection to a powered vehicle, platform means at the rear portion of the main support, means pivotally mounting the platform means to the rear end portion for movement between an outwardly and downwardly inclined first position relative to the main support and an outwardly and generally parallel second position relative to the main support, and means movable relative to the platform means for moving the latter between the first and second positions at which a disabled vehicle is respectively drawn upwardly along the platform means prior to transport and supported by the platform means and the main support during transit.

A further object of this invention is to provide a novel vehicle ambulance of the type heretofore described wherein the movable means include follower means carried by the platform means contoured to effect the movement of the platform means between the first and second positions, and the movable means further includes actuator means carried by the main support for movement along the contoured follower means to produce the movement of the platform means between the first and second positions.

A further object of this invention is to provide a novel vehicle ambulance of the type heretofore set forth wherein the mounting means further mounts the platform means for pivotal movement to a third generally upright position during unloaded transport of the vehicle ambulance or when the latter is parked or "stored".

Still another object of this invention is to provide a novel vehicle ambulance of the type aforesaid wherein the platform means is defined by a pair of laterally spaced platform members each having an upper surface adapted to support a portion of a disabled vehicle, the movable means including like-contoured follower means carried by each platform member to effect the movement of the platform members in unison between the first and second positions, and the movable means further including a pair of actuator means carried by the main support for simultaneous movement each along a respective one of the follower means to produce generally simultaneous movement of the platform members between the first and second positions.

A further object of this invention is to provide a novel vehicle ambulance of the type aforesaid wherein is provided a guide or slide frame carrying the pair of actuator means, the main support having means at opposite lateral sides thereof mounting the guide frame for generally horizontal reciprocal movement, and extensible-retractable fluid motor means mounted between the guide frame and the main support for imparting reciprocal movement to the guide frame and the pair of actuator means carried thereby to move the platform members between the first and second positions.

Still another object of this invention is to provide a novel vehicle ambulance of the type heretofore described wherein is provided a light assembly for stop lights, turn signals, etc., and means mounting the light assembly to the platform members in both the first and third positions thereof.

Still another object of this invention is to provide a novel vehicle ambulance of the type described including a fluid driven winch, means providing a source of pressurized fluid, means placing the fluid motor and winch in fluid communication with the pressurized fluid source, and valve means for selectively directing fluid from the source to the fluid motor and winch.

Yet another object of this invention is to provide a novel vehicle ambulance of the type heretofore set forth wherein the guide frame is of a generally H-shaped configuration as viewed in horizontal plan and is defined by a pair of legs and a cross-connecting arm, terminal end portions of the legs defining said pair of actuator means, and the fluid motor means being connected between the cross-connecting arm and the main support.

With the above and other objects in view that will hereinafter appear, the nature of the invention will be more clearly understood by reference to the following detailed description, the appended claimed subject matter, and the several views illustrated in the accompanying drawings.

In the drawings:

FIG. 4 is a top plan view of the vehicle ambulance, and illustrates the platform members in their upright position and a pair of actuator means in their retracted position for cooperating with follower means on the underside of the platform members to move the latter between the position shown in FIGS. 2 and 3.

FIG. 5 is a side elevational view of the vehicle ambulance, and illustrates means for supporting the platform members in the upright position thereof, as well as a fluid driven winch and the manner of tethering its cable when not in use.

FIG. 5-A is a schematic view of that portion of a hydraulic system carried by the vehicle ambulance, and illustrates valve means for selectively directing fluid pressure from a pressurized source to the winch and an extensible-retractable fluid motor for reciprocating a guide or slide frame carrying the pair of actuator means.

Figure 6:
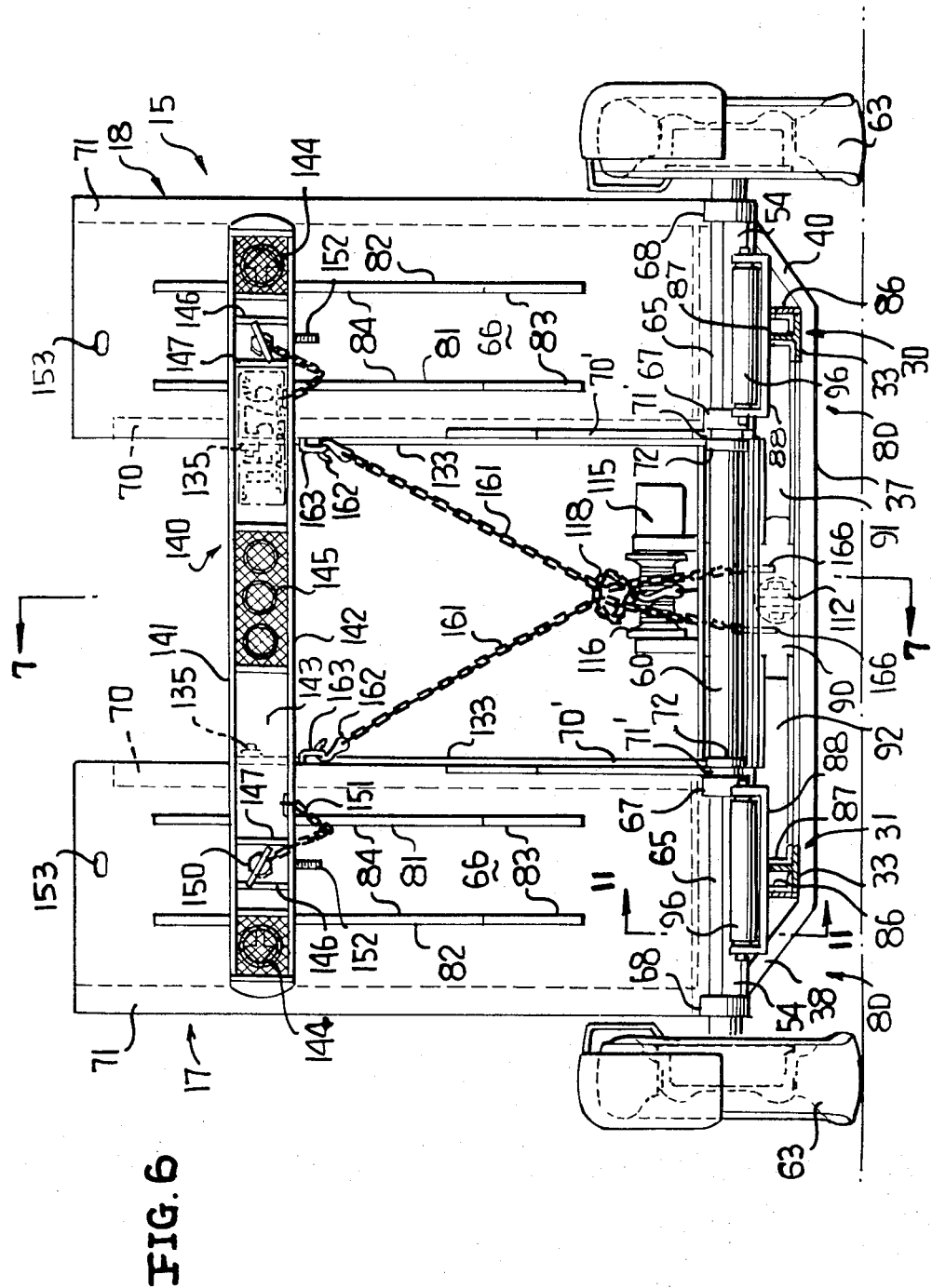

FIG. 6 is an enlarged rear view of the vehicle ambulance taken generally along line 6—6 of FIG. 5, and more clearly illustrates the follower means at the underside of each of the platform members, the pair of actuator means, and the manner in which the guide frame is slidably mounted relative to the main support.

FIG. 7 is a sectional view taken generally along line 7—7 of FIG. 6, and more clearly illustrates the manner in which the fluid motor is articulately coupled between the main support and the guide frame.

FIG. 8 is a fragmentary sectional view taken along the line 7—7 of FIG. 6, and illustrates the retracted position of the fluid motor and in solid lines the downwardly and rearwardly inclined position of the platform members.

FIG. 9 is a fragmentary sectional view of the vehicle ambulance shown in FIG. 8, and illustrates the fluid motor in its extended position with the actuator means supporting the platform members in a horizontal plane.

Figure 10:
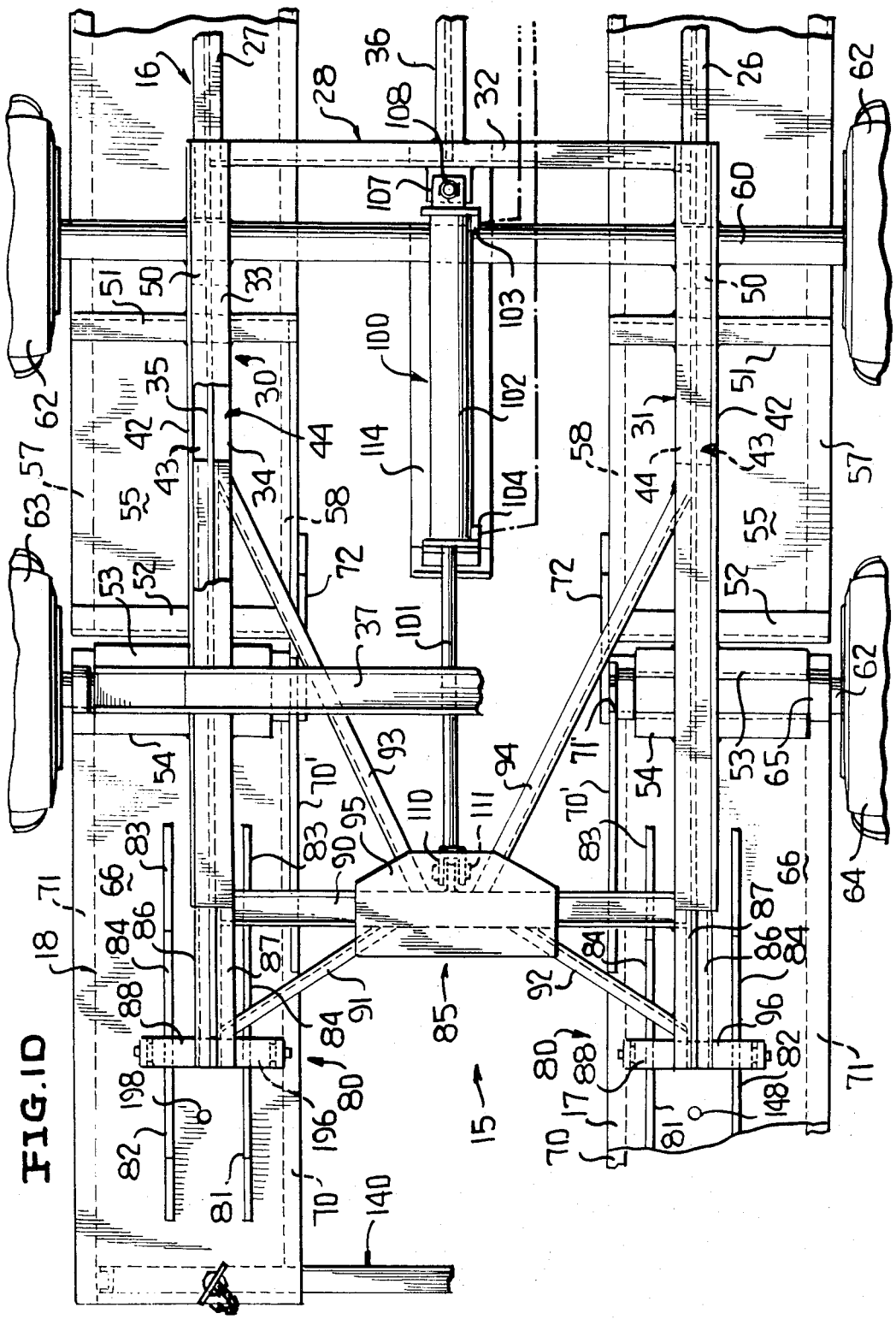

FIG. 10 is a fragmentary sectional view taken generally along line 10—10 of FIG. 9, and more clearly illustrates the relationship between the guide frame, the pair of actuator means and the follower means of the platform members in the horizontal position of the latter.

Figure 1:
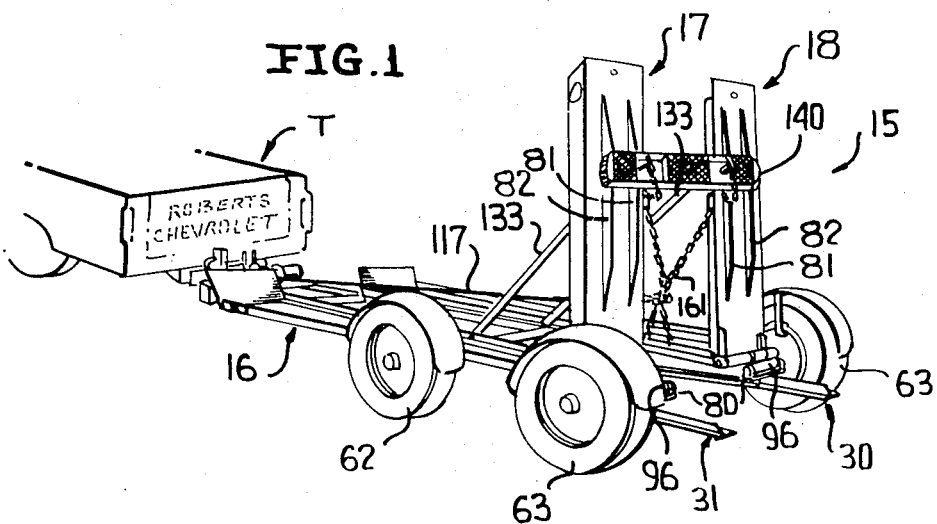
FIG. 1 is a side perspective view of the vehicle ambulance of this invention viewed from the rear thereof, and illustrates the same connected to a pick-up truck or similar powered vehicle with a pair of pivotally mounted platform members in a generally upright position during the transport of the vehicle ambulance in an unloaded condition.
Figure 2:
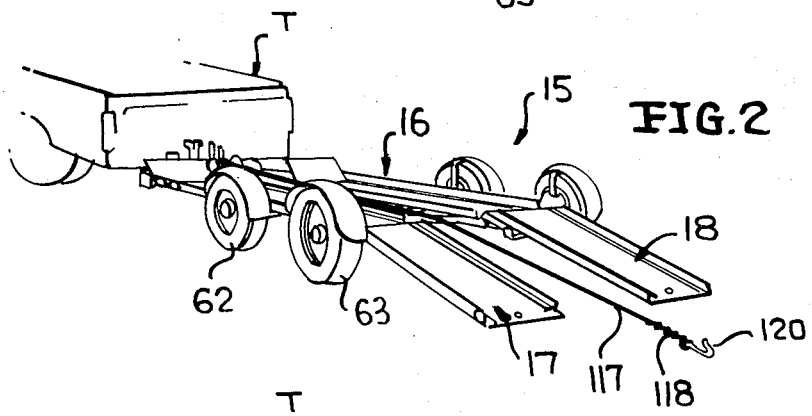
FIG. 2 is a perspective view similar to FIG. 1, but illustrates the platform members in a rearwardly and downwardly inclined position incident to pulling a disabled vehicle upwardly therealong and at least partially upon a main support of the ambulance.

FIG. 11 is a fragmentary sectional view taken generally along line 11—11 of FIG. 6, and illustrates the manner in which one of the platform members is mounted for pivotal movement between the positions illustrated in FIGS. 1 and 2.

FIG. 12 is a fragmentary enlarged sectional view taken generally along line 12—12 of FIG. 9, and more clearly illustrates the reciprocal mounting of the guide frame relative to the main support.

Figure 3:
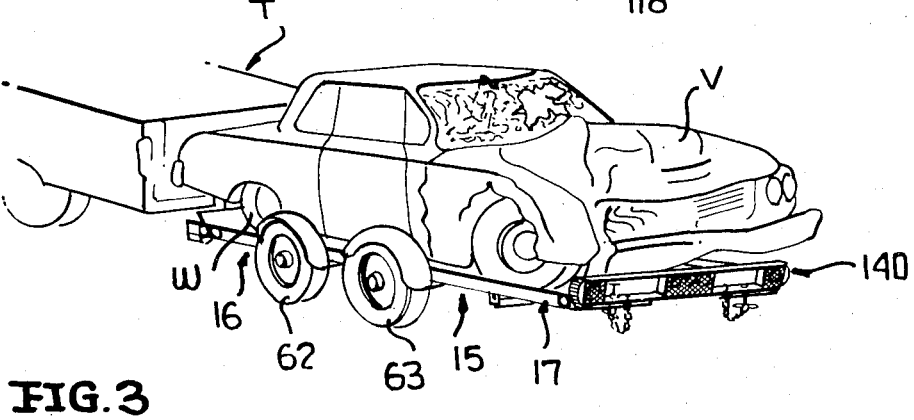
FIG. 3 is a perspective view similar to FIGS. 1 and 2, and illustrates a disabled vehicle supported by the main support and the pair of platform members, with the latter now being illustrated generally parallel to the horizontal for clearance during transit.

Reference is first made to FIGS. 1 through 3 wherein the novel vehicle ambulance of this invention is generally designated by the reference numeral 15, and is shown coupled to a pick-up truck T, or similar powered vehicle. The pick-up truck T is of a conventional construction but additionally includes beneath its hood a five gallon hydraulic fluid (oil) reservoir or tank, a pump driven by the engine through a conventional pulley-belt drive, and a pair of fluid conduits connected to the reservoir and pump at one end and terminating at opposite ends in conventional couplings at the rear of the couplings at the rear of the pick-up truck T.

The vehicle ambulance 15 includes a main support, generally designated by the reference numeral 16 having a forward portion (unnumbered) adjacent the pick-up truck T and a rear portion (unnumbered) remote therefrom to which is pivotally secured platform means in the form of a pair of laterally spaced platform members 17, 18. In FIG. 1 the platform members 17, 18 are shown in an upright position whereat they are secured in a manner to be described hereinafter when the vehicle ambulance 15 is being towed by the pick-up truck T without a disabled vehicle thereon or when uncoupled from the pick-up truck T and parked or "stored".

When it is desired to transport a disabled vehicle the platform members 17, 18 are lowered to the position shown in FIG. 2 to form an incline plane along which a disabled vehicle V (FIG. 3) may be pulled toward and upon the main frame 16. Thereafter the platform members 17, 18 are moved by means to be described hereinafter to a generally horizontal position (FIG. 3) to permit the vehicle V to be transported by the vehicle ambulance 15. It is to be noted that the disabled vehicle V is supported by both the main support 16 and the platform members 17, 18 when the vehicle ambulance 15 is towed by the pick-up truck T.

Referring now particularly to FIGS. 4, 5 and 10 of the drawings, the main support or frame 16 includes a pair of forwardly converging I-beams 20, 21 welded to each other and to a plate 23 at their forward ends (unnumbered). Another I-beam 24 (FIGS. 4 and 5) is welded to the rearward ends (also unnumbered) of the I-beams 20, 21. Another I-beam 25 is welded at one end to the I-beams 20, 21 and to its opposite end at generally the midpoint of the I-beam 24. A pair of the side or lateral I-beams 26, 27 are welded at their forward ends (not shown) to the respective I-beams 20, 24 and 21, 24. At the left or rearward ends (FIG. 10) of the I-beams 26, 27 the same rest upon and are welded to a generally U-shaped frame defined by a pair of lateral or side generally parallel legs 30, 31 and a bight portion 32. The legs 30, 31 are each defined by an I-beam having a lower flange 33 (FIG. 10), an upper flange 34 and a web 35 therebetween, while the bight portion 28 is defined by a C-beam which, as viewed in FIG. 10, opens to the right. Another I-beam 36 is welded at its forward end to the I-beam 24 (FIGS. 4 and 5) and at its rearward end (FIGS. 8 through 10) to the midpoint of the C-beam 32. A downwardly opening C-beam 37 (FIGS. 6 through 10) having opposite inclined ends 38, 40 (FIG. 6) is welded to the lower flanges 33 of the I-beams 30, 31.

As is best illustrated in FIGS. 10 and 12, the I-beams 30, 31 each include a plate 42 extending the length of the lowermost flanges 33, and being welded between outboard edges of the flanges 33, 34 (FIG. 12) to define with the web 35 a guide channel or chamber 43. Another guide channel or chamber 44 is formed between the inboard edges of the flanges 33, 34 and the web 35, in the manner best illustrated in FIGS. 10 and 12. The channels or chambers 43, 44 of both of the legs 30, 31 extend from the C-beam 32 (FIGS. 8 and 10) to the end of the flanges 34, 34 beyond which projects the flanges 33, 33 (FIG. 8) and between the ends of which the webs 35, 35 are cut away and inclined as indicated at 45, 46, respectively, to permit the platform members 17, 18 to move without interference to the rearwardly and downwardly inclined position illustrated in FIG. 8.

Welded atop the upper flange 34 of each of the I-beams 30, 31 are five angle bars 50 through 54 (FIGS. 8 through 10) of which the angle bars 51, 52 have vertical upstanding portions (unnumbered) whose uppermost edges (also unnumbered) are in a plane common to the upper surfaces of the I-beams 26, 27. A rectangular plate or platform member 55 is supported upon and welded to the angle bars 51, 52 carried by the I-beam 31 (FIGS. 8 through 10) and to the upper surface of the uppermost flange (unnumbered) of the I-beam 26. Likewise, a similar rectangular plate or platform member 56 is welded to the upper surfaces of the angle bars 51, 52 carried by the I-beam 30 and to the upper surface of the I-beam 27. The forwardmost ends of the platform members 55, 56, as viewed in FIGS. 4 and 5, are also welded to the upper flange (unnumbered) of the I-beam 24. The platform members 55, 56 function to support at least a portion of the vehicle V, particularly through the tires and wheels thereof, in the manner readily apparent from FIG. 3 of the drawings. To this end each of the platform members 55, 56 has secured by welding to the upper surface thereof outboard and inboard angle bars 57, 58 (FIG. 12) to function as guides for wheels W (FIG. 3) of the disabled vehicle V as it is pulled upon the plate members 55, 56.

The brackets 50, 50 carried by the I-beams 30, 31 cooperate with the I-beams 26, 27 to support a tubular housing 60, in the manner best illustrated in FIGS. 8 through 10 of the drawings. The tubular housing 60 is welded to the brackets 50, 50 and to the I-beams 26, 27 and functions to rotatably support a shaft 61 at opposite ends of which are conventionally secured appropriate wheels and tires, generally designated collectively by the reference numerals 62. Similar wheels and tires, collectively designated by the reference numerals 63 (FIG. 10) are each connected to a shaft 64 which is in turn journalled for rotation in a housing 65 sandwiched between and welded to the upright portions (unnumbered) of the brackets 53, 54 of each of the I-beams 30, 31, in the manner best illustrated in FIG. 11 of the drawings.

Reference is now made to FIGS. 6, 10 and 11 of the drawings which indicates the manner in which the platform members 17, 18 are mounted for pivotal movement relative to the main support 16. The platform members 17, 18 are each defined by a metallic rectangular plate 66 having inboard and outboard generally U-shaped brackets 67, 68 welded to the underside thereof with the brackets 67, 68 surrounding the housings 65, in the manner best illustrated in FIG. 11. Thus, each of the housings 65 functions in conjunction with the brackets 67, 68 to define means for pivoting the platforms 17, 18 between the positions illustrated in FIGS. 1 through 3 of the drawings. Lateral movement or side sway of the platform members 17, 18 is limited by the position of the brackets 53, 54 (FIGS. 6 and 10) between the journals or U-shaped brackets 67, 68. Moreover, the prevention of lateral movement of the platform members 17, 18 is augmented by a plate 70' secured to the underside of each of the platform members 17, 18 adjacent inboard edges thereof. Each plate 70' has a downwardly opening U-shaped slot 71' which receives the exterior surface of each housing 65 with the portion of the plate 70' adjacent each slot 71' being sandwiched between its adjacent journal 67 and a plate 72 welded to the end of each housing 65 and to the inboard angle bars 58, 58 (FIG. 10) of the platform members 55, 56.

As in the case of the platform members 55, 56, the platform members 17, 18 include at upper surfaces thereof inboard angle bars 70, 70 and outboard angle bars 71, 71 for guiding the wheels W of the disabled vehicle V as the same is pulled upwardly along the platform members 17, 18 when the latter are positioned as shown in FIG. 2. The outboard angle bars 71, 71 are, of course, aligned with the outboard angle bars 57 of the platform members 55, 56 while like alignment is provided between the angle bars 70, 70 and 58, 58. Thus, during the pulling of the disabled vehicle V upon the main support 16 guidance is continuously afforded except for the transition area between the stationary and pivotal platform members at the housings 65.

Actuator means 80 (FIGS. 6 through 10) are provided for moving the platform members from the position shown in FIGS. 2 and 9 to the position shown in FIGS. 3 and 8, respectively. The actuator means 80 are carried in part by the platform members 17, 18 and by the main frame 16.

The portions of the actuator means 80 carried by the platforms 17, 18 are a pair of follower means formed by plates 81, 82 welded to the underside of each of the platform members 17, 18. Each of the plates 81, 82 includes an inclined leading edge 83 and a straight edge 84 (FIG. 7).

The portion of the actuator means 80 carried by the main frame 16 includes a guide or slide frame 85 (FIG. 10) formed by two pairs of lateral angle bars 86, 87 received in the respective channels 43, 44 (FIG. 12) of the I-beams 30, 31. The angle bars 86, 87 are joined to each other at one end by a transverse plate 88, and the laterally inboard angle bars 87, 87 are joined to each other by an I-beam 90 (FIG. 10). A pair of leftwardly opening (as viewed in FIG. 10) C-beams 91, 92 are welded between the C-beams 87, 87 and the I-beam 90, while a pair of rightwardly opening (as viewed in FIG. 10) C-beams 93, 94 are welded between the angle bars 87, 87 and the I-beam 90. A reinforcing plate 95 is welded to the upper and lower surfaces of the beams and angle bars 90 through 94 generally at the intersection thereof.

As is best illustrated in FIGS. 6 and 10, the plates 88 include upwardly directed arms (unnumbered) between which are journalled rollers 96, 96 which are in alignment with the plates 81, 82 of the platform members 17, 18. As is readily apparent from a comparison of FIGS. 8 and 9, movement of the guide frame 85 to the left from the position illustrated in FIG. 8 causes the rollers 96 to ride along the inclined surfaces 83 of the plates 81, 82 to pivot the platform members 17, 18 in a clockwise direction from the position shown in FIG. 8 to that shown in FIG. 9. Likewise, retraction of the guide frame 85 to the right from the position shown in FIG. 9 permits the platform members 17, 18 to descend or pivot counterclockwise to return to the position shown in FIG. 7.

The manner in which the guide frame 85 is reciprocated will be best understood by reference to FIGS. 7 through 10 in which is illustrated an extensible and retractable fluid motor 100 having a piston rod 101 and a cylinder 102 which includes ports 103, 104 at the head and rod end respectively. The cylinder 102 includes a pair of brackets 105, 106 between which is received a plate 107 welded to the beam 32. A bolt and nut 108 pivotally unites the cylinder 102 to the plate 107 in a conventional manner. The piston rod 101 includes a bifurcated end portion 110 which is likewise pivotally secured by a bolt and nut 111 to a plate 112 welded to the I-beam 90. In FIG. 10 the piston rod 101 is shown fully extended by virtue of pressurized fluid being introduced into the cylinder 102 through the port 103. However, upon the introduction of fluid into the cylinder 102 through the port 104, during which time the port 103 is open to permit the fluid at the head end to return to a reservoir, the guide frame 85 is retracted to its fully retracted position (FIGS. 7 and 8).

Since the vehicle ambulance 15 is towed much of the time with the guide frame 85 in its retracted position (FIG. 7), a plate 114 (FIGS. 7 and 10) is suitably secured to the main support 16 in overlying relationship to the cylinder 102 and the retracted piston 101. If desired, a like plate could be secured to the main frame 16 to protect the underside of the retracted fluid motor.

Referring to FIGS. 4, 5 and 5-A, the main frame 16 includes at its forward end a number of plates (unnumbered) spanning and welded to the beams 20, 21 and 25. Secured to one of these plates is a conventional fluid driven winch 115 having a rotatable drum 116 upon which is wound a cable 117 terminating in a chain 118 and a hook 120. The fluid driven winch 115 is a part of a pressurized hydraulic system, generally designated by the reference numeral 125 (FIG. 5-A) which also includes the extensible and retractable fluid motor 100. The system 125 includes a conventional valve 121 having a pair of levers 122, 123 shown in their neutral positions. The lever 122 when moved upwardly as viewed in FIG. 5-A results in the rotation of the drum 116 in an unwind direction while downward movement of the lever 122 results in opposite rotation of the drum 116. Likewise, upward movement of the lever 123 results in the retraction of the rod 101 while downward movement of the lever 123 results in the extension thereof.

The system 125 further includes six conduits 126 through 131 which are coupled between the components 100, 115, and 121 in the manner clearly illustrated in FIG. 5-A. Though not illustrated, the conduits 130, 131 each include female couplings of the quick-connect type for attachment to male couplings carried by the pick-up truck T. These couplings are preferably of a conventional construction which prevents improper cross-coupling, it being noted that the conduit 131 must be connected to the output of the pump heretofore noted while the conduit 130 serves as a return to the reservoir.

During rotation of the drum 116 of the fluid motor 115 in an unwind direction upon the movement of the lever 122 upwardly or inwardly, fluid flows from the reservoir or tank to the pump and associated conduit and coupling means to the conduit 131, the valve 121, the conduit 129, the fluid motor 115, the conduit 128, the conduit 130, and is returned to the reservoir. In the winding direction upon downward movement of the lever 122 the flow path is identical except that fluid flows to the fluid motor 115 through the conduit 128 and returns therefrom through the conduit 129 and the conduit 130 to the reservoir.

In a like manner, the rod 101 of the fluid motor 100 is extended to move the guide frame 85 to the left as viewed in FIG. 5-A by fluid flow from the reservoir, to the pump and through the conduit 131, the valve 121, the conduit 127, the port 103 and the cylinder 102 with fluid simultaneously being exhausted to the reservoir from the port 104 through the conduit 126, the valve 121 and the return conduit 130. Retraction of the rod 101 takes place during fluid flow in a like manner except that fluid is introduced into the cylinder 102 through the condut 126 and the port 104 while fluid is exhausted from the port 103 and the conduits 127, 130.

The platforms 17, 18 are supported in an upright position (FIGS. 4, 5 and 7) by means of identical arms 133, 133 pivotally secured to the inboard angle bars 58, 58 of the main support 16 by conventional bolts and nuts indicated collectively by the reference numerals 134. Opposite ends of the arms 133 are apertured to receive a rod 135 (FIG. 7). The rod 135 has a bore in which is placed a cotter pin or drift pin (not shown). This permits the arms 133 to be rapidly secured to or removed from the rods 135. When not in use the arms 133 are pivoted clockwise as viewed in FIG. 7 to a horizontal position and are thereat supported by brackets 136, 136 (FIG. 4).

In the position of the platforms 17, 18 shown in FIGS. 1 and 3, the vehicle ambulance 15 carries a light assembly, generally designated by the reference numeral 140. The light assembly 140 (FIG. 6) is a C-beam having upper and lower flanges 141, 142 and a bight portion 143. Directional signals 144, stop lights 145 and whatever additional lighting required by any particular vehicle code are conventionally carried by the light assembly 140 and are quick-connected to suitable wiring (not shown) running along the undersides of the platforms 17, 18 to the forward end of the main support 16 whereat like quick-connect couplings are provided for connection to the electrical system of the pick-up truck T. Between each of two pair of plates 146, 147 the web 143 is apertured and receives therethrough a threaded bolt 148 (FIG. 10) welded to the underside of the platforms 17, 18 and projecting outwardly therefrom. A nut 150 which is secured by a chain 151 to the lower flange 142 is threaded upon each of the bolts 148 to support the light assembly 140 against the plates 81, 82 when the platforms 17, 18 are in te upright positions shown in FIGS. 6 and 7.

When in the positions shown in FIG. 3, like threaded bolts 152, 152 welded to the flange 142 are received in openings 153 of the platforms 17, 18 and are secured thereto by the nuts 150. Thus, appropriate lighting is provided in both "travel" positions of the platforms 17, 18 (FIGS. 1 and 3), but the light assembly 140 is readily removed for the loading or unloading of vehicles (FIG. 2).

A pair of inverted generally U-shaped rods 160, 160 (FIGS. 6 and 7) are welded to the I-beam 90 of the guide frame 85 and secured to each is a chain 161 having at its opposite end a hook 162. The chains 161 are used to secure the vehicle V upon the ambulance 15 when in the position illustrated in FIG. 3, but when not in use the hooks 162 are hooked into handles 163, 163 welded to the platforms 17, 18 (FIG. 6).

OPERATION

It will be assumed for the purpose of describing the operation of the vehicle ambulance 15 that the same is merely parked in the condition shown in FIGS. 4 and 5 with the platforms 17, 18 being in their upright positions, the guide frame 85 being retracted and the chain 118 wrapped about the chains 161, 161 and drawn taut by the previous winding of the drum 116.

The vehicle ambulance 15 is first connected to the pick-up truck T by means of a conventional coupling C (FIGS. 4 and 5) which may be, for example, a ball and socket coupler. The conduits 130, 131 are then connected to the quick-connect couplings of the truck T (not shown), and the wiring (also not shown) from the light assembly and side lights or other auxiliary lights is likewise connected to the electrical system of the pick-up truck T by similar electrical quick-connect couplings (not shown). The truck T may now be driven to a desired destination, and if this takes place at night the electrical system of the truck T provides the necessary current for the lights of the vehicle ambulance 15 and, of course, the turn signals 144, 144 are likewise operated by the turn signal system of the truck T. It should be noted that the upright position of the platforms 17, 18 prevent unnecessary rear end overhang, and the taut condition of the cable 117 holds the chains 161, 161 in the position best illustrated in FIGS. 4 through 6 to prevent unnecessary noise, rattling, etc.

Though it makes no difference as to the particular damage or condition of the disabled vehicle, it will be assumed for the purpose of this description that the vehicle V has suffered front end damage and will be pulled upon the vehicle ambulance 15 rear end first. The truck T is maneuvered to position the vehicle ambulance 15 in general alignment with the rear end of the vehicle V and with the truck engine running the lever 122 (FIG. 5–A) is operated to drive the drum 116 in an unwind direction to slacken the cable 117 to permit its release from the chains 161, 161 and to extend sufficient cable (FIG. 2) to connect the chain 118 thereof to the vehicle V. Thereafter the light assembly 140 is removed from the underside of the platform members 17, 18, the hooks 162, 162 are removed from the handles 163, 163, and while manually supporting each of the platform members 17, 18, the arms 133, 133 are disconnected from the bolts 135. Each of the platform members 17, 18 is thus manually lowered to the position shown in FIG. 2 at which point the free ends of the platform members 17, 18 rest upon the ground adjacent to and in alignment with the rear wheels W of the vehicle V. If the vehicle ambulance 15 was parked sufficiently close to the vehicle V initially, no further maneuvering would be necessary and upon securing the chain 118 to the rear end of the vehicle V, the latter can be pulled up the platform members 17, 18 and upon the platform members 55, 56 by operating the lever 122 to rotate the drum 116 in its wind direction, it being noted that the truck engine at this time is still running to supply the necessary power for the pump which supplies the fluid to the winch 115 through the conduit 131 in the manner heretofore described.

If it is necessary to move the vehicle ambulance 15 closer to the vehicle V the truck T may be backed up while the platforms 17, 18 are in the position shown in FIG. 2. However, this may cause unnecessary scraping of the platforms 17, 18 along the ground and desirably the lever 123 is operated to extend the piston rod 101 to move the guide frame 85 outwardly from the position shown in FIG. 8 toward but not necessarily entirely to the position shown in FIG. 9. The rollers 96 acting against the inclined surfaces 83 of the plates 81, 82 progressively raise the platform members 17, 18, and by releasing the lever 123 the operator may selectively position the platform members 17, 18 at any position between those shown in solid outline in FIGS. 8 and 9. For example, it might only be necessary to lift the ends of the platform members 17, 18 an inch or two off the ground to permit the vehicle ambulance 15 to be backed closer to the disabled vehicle V without scraping the platform members 17, 18. Once this has been accomplished the lever 123 is operated to retract the guide frame 85 along with the rollers 96 and the ends of the platform members 17, 18 again contact the ground and the vehicle V may now be connected to the chain 118 and drawn upon the vehicle ambulance 15 until its rear end is positioned adjacent the truck T and its front end is supported upon the platform members 17, 18. Thereafter the lever 123 is appropriately operated to extend the piston rod 101 which progressively moves the rollers 96, 96 along the inclined surfaces 83, 83 of the plates 81, 82 to pivot the platform members 17, 18 from the position shown in FIG. 8 to that shown in FIGS. 3 and 9, after which the lever 123 is released and the entire vehicle V is supported by the platform members 17, 18, 55, and 56.

The chains 161, 161 are then connected to the front end of the vehicle V as snugly as possible after which the lever 123 is again operated to rotate the drum 116 in its wind direction and pull the vehicle V toward the truck T until the chains 161, 161 are taut after which the lever 123 is returned to its neutral position thus closing the system 125 thereby locking the fluid motor 115 and preventing the unwinding of the drum 116 even upon the cutting off of the truck engine. In this manner the vehicle V is held safely in position upon the vehicle ambulance 15 by the chains 161, 161, 118, the cable 117, and the pressure trapped in the fluid motor 115 may be, for example, Model A6M[M207B] manufactured by Char-Lynn of Eden Prairie, Minnesota.

The light assembly 140 is then secured upon the platform members 17, 18 by appropriately inserting inserting the bolts 152 through the apertures 153 and securing thereto the nuts 150. The various lights carried by the assembly 140 are connected to the wiring at the underside of the platforms 17, 18 (not shown) in the manner heretofore described and the vehicle ambulance 15 may now be towed by the truck T to deliver the disabled vehicle V to a desired destination whereat reverse operations to those heretofore described are carried out to remove the disabled vehicle V from the ambulance 15. That is, the light assembly 140 is removed, the drum 116 is rotated to slacken the cable 117 so that the chains 161, 161 and 118 can be removed from the vehicle V, after which the guide frame 85 is retracted causing the pivotal movement of the platforms 17, 18 from the position shown in FIG. 9 to that illustrated in FIG. 8. Once the vehicle V has been removed, all components of the vehicle ambulance 15 may again be returned to the positions thereof illustrated in FIG. 1.

Though a preferred embodiment of the ambulance vehicle 15 has been described heretofore, it is to be understood that various modifications would be apparent to persons skilled in the art and are included in the present disclosure. As an example, the rollers 96, 96 (FIG. 6) may be eliminated since the purpose thereof is merely that of reducing friction between the inclined surfaces 83 of the plates 81, 82, and such rolling or anti-friction contact is unnecessary to effect the pivoting of the platforms 17, 18 during the reciprocal movement of the guide frame 85.

Moreover, though the description of the operation of the vehicle ambulance 15 has been made in regard to the vehicle V having front end damage disabled vehicles of any type with or without wheels can and have been successfully transported by an actual working embodiment of the present invention.

While preferred forms and arrangements of parts have been shown in illustrating the invention, it is to be clearly understood that various changes in details and arrangement of parts may be made without departing from the spirit and scope of this disclosure.

I claim:

1. A vehicle ambulance comprising a main support adapted to receive thereon at least a portion of a disabled vehicle, means for rollingly supporting said main support for movement over terrain, said main support having front and rear end portions, platform means at said rear end portion, means pivotally mounting said platform means to said rear end portion for movement between an outwardly and downwardly inclined first position relative to said main support and an outwardly and generally parallel second position relative to said main support, means reciprocally linearly movable relative to and against said platform means outboard of said pivot mounting means along a path generally parallel to said main support for contacting and moving the platform means between said first and second positions, said movable means includes follower means carried by said platform means contoured to effect the movement of said platform means between said first and second positions, said movable means further includes actuator means carried by said main support for movement along said contoured follower means to produce the movement of said platform means between said first and second positions, and said follower means define an inclined plane along which said actuator means moves to move said platform means from said first position to said second position upon movement of said actuator means in a direction away from said pivot mounting means and outboard thereof.

2. The vehicle ambulance as defined in claim 1 wherein said mounting means further mounts said platform means for pivotal movement to a third generally upright position, a light assembly, means removably mounting said light assembly to said platform means in both said second and third positions thereof, and said light assembly mounting means includes threaded fastener means common to said light assembly when secured to said platform means in both said second and third positions.

3. The vehicle ambulance as defined in claim 1 wherein said mounting means further mounts said platform means for pivotal movement to a third generally upright position.

4. The vehicle ambulance as defined in claim 1 wherein said mounting means further mounts said platform means for pivotal movement to a third generally upright position, and means for securing said platform means in said third position.

5. The vehicle ambulance as defined in claim 1 wherein said movable means includes a fluid motor.

6. The vehicle ambulance as defined in claim 1 wherein said platform means is defined by a pair of laterally spaced platform members each having an upper surface adapted to support a portion of a disabled vehicle.

7. The vehicle ambulance as defined in claim 1 wherein said mounting means further mounts said platform means for pivotal movement to a third generally upright position, a light assembly, and means mounting said light assembly to said platform means in both said second and third positions thereof.

8. The vehicle ambulance as defined in claim 1 including a guide frame carrying said pair of actuator means, said main support having means at opposite lateral sides thereof mounting said guide frame for generally horizontal reciprocal movement, and extensible-retractable fluid motor means mounted between said guide frame and said main support for imparting reciprocal movement to said guide frame and said pair of actuator means carried thereby to move said platform members between said first and second positions.

9. The vehicle ambulance as defined in claim 8 including means for articulately coupling said fluid motor means between said main support and said guide frame.

10. The vehicle ambulance as defined in claim 1 including a winch driven by a fluid motor, means providing a source of pressurized fluid, means placing said fluid motor in fluid communication with said pressurized fluid source, and valve means for selectively directing fluid from said source to said fluid motor.

11. The vehicle ambulance as defined in claim 8 wherein said guide frame mounting means is defined by a pair of channels at each of said lateral sides, and said guide frame includes a support member mounted for sliding movement in each of said channels.

12. The vehicle ambulance as defined in claim 8 wherein said guide frame is of a generally H-shaped configuration as viewed in horizontal plan and is defined by a pair of legs and a cross-connecting arm, terminal end portions of said legs defining said pair of actuator means, and said fluid motor means is connected to said cross-connecting arm.

13. The vehicle ambulance as defined in claim 11 wherein each pair of channels are separated by means between each pair of support members to limit lateral movement of the latter.

14. The vehicle ambulance as defined in claim 11 wherein said mounting means further mounts said platform members for pivotal movement to a third generally upright position, a light assembly, and means mounting said light assembly to said platform members in both said second and third positions thereof.

15. The vehicle ambulance as defined in claim 4 including a fluid driven winch, means providing a source of pressurized fluid for driving said winch, cable means adapted to be wound upon and unwound from said winch, means for connecting said cable means to said platform means in said third position, and means for energizing said winch through said pressurized fluid source sufficiently to render said cable means taut to augment the support thereof by said securing means.

16. The vehicle ambulance as defined in claim 15 wherein said securing means and winch are supported on said main support on opposite sides of said platform means when the latter is in the third position thereof.

17. The vehicle ambulance as defined in claim 10 including a motorized vehicle for towing said vehicle ambulance, and said fluid source is carried by said motorized vehicle.

18. The vehicle ambulance as defined in claim 17 including conduit means for conducting fluid between said fluid motor and said fluid source, and pump means carried by said motorized vehicle for pressurizing said fluid.

19. The vehicle ambulance as defined in claim 18 including means for uncoupling said conduit means between said fluid motor and said fluid reservoir to enable utilization of said motor vehicle apart from said vehicle ambulance.

20. A vehicle ambulance comprising a main support adapted to receive thereon at least a portion of a disabled vehicle, means for rollingly supporting said main support for movement over terrain, said main support having front and rear end portions, platform means at said rear end portion, means pivotally mounting said platform means to said rear end portion for movement between an outwardly and downwardly inclined first position relative to said main support and an outwardly and generally elevated parallel second position relative to said main support, means solely reciprocally linearly movable relative to and engagable against said platform means rearwardly of said pivot mounting means along a path parallel to said main support for contacting and moving the platform means between said first and second positions and means beneath said platform means for supporting said reciprocal means at a position rearwardly of said pivot mounting means when said platform means is in said second position.

21. The vehicle ambulance as defined in claim 20 wherein said movable means is normally housed substantially entirely beneath said main support.

22. The vehicle ambulance as defined in claim 21 wherein said movable means includes a pair of elongated bars in generally spaced parallel relationship, means interconnecting said bars to each other, means guidingly supporting said bars during the linear reciprocal motion threof, and end of each bar constituting the means operative against said platform means, and hydraulic means connected to said interconnected bars for reciprocating the same to achieve motion of said platform means between said first and second positions.

23. The vehicle ambulance as defined in claim 22 wherein said platform means are a pair of individually pivotally supported unconnected platforms.

\* \* \* \* \*